(12) United States Patent
Abe et al.

(10) Patent No.: US 7,869,159 B2
(45) Date of Patent: Jan. 11, 2011

(54) APPARATUS AND METHOD FOR REDUCING TURBULENCE OF AIRFLOW IN A HARD DISK DRIVE

(75) Inventors: Yukinobu Abe, Chiba (JP); Andre S. Chan, Milpitas, CA (US); Ferdinand Hendriks, Morgan Hill, CA (US); Masato Ikegawa, Ibaraki (JP); Hiroshi Mukai, Ibaraki (JP); Keiichi Takemori, Ibaraki (JP)

(73) Assignee: Hitachi Global Storage Technologies, Netherlands, B.V., Amsterdam (NL)

( * ) Notice: Subject to any disclaimer, the term of this patent is extended or adjusted under 35 U.S.C. 154(b) by 798 days.

(21) Appl. No.: 11/824,197

(22) Filed: Jun. 28, 2007

(65) Prior Publication Data

US 2009/0002879 A1 Jan. 1, 2009

(51) Int. Cl.
*G11B 5/54* (2006.01)
(52) U.S. Cl. .................................. 360/97.02
(58) Field of Classification Search ............... 360/97.02
See application file for complete search history.

(56) References Cited

U.S. PATENT DOCUMENTS

| | | | |
|---|---|---|---|
| 4,147,299 | A | 4/1979 | Freeman |
| 6,449,119 | B1 | 9/2002 | Hashizume et al. |
| 6,542,328 | B2* | 4/2003 | Harrison et al. ......... 360/97.03 |
| 6,560,065 | B1 | 5/2003 | Yang et al. |
| 6,700,736 | B1 | 3/2004 | Wu et al. |
| 6,728,062 | B1 | 4/2004 | Ou-Yang et al. |
| 6,876,514 | B1 | 4/2005 | Little |
| 6,930,857 | B1* | 8/2005 | Lin et al. .................. 360/97.02 |
| 7,002,773 | B2* | 2/2006 | Kang et al. ............... 360/97.02 |
| 7,027,259 | B2 | 4/2006 | Myokan et al. |
| 7,312,950 | B2* | 12/2007 | Voights et al. ........... 360/97.02 |
| 7,327,530 | B2* | 2/2008 | Lee et al. .................. 360/97.02 |
| 7,420,775 | B2* | 9/2008 | Lim ........................ 360/97.03 |
| 7,453,667 | B2* | 11/2008 | Cho et al. ................. 360/97.03 |
| 2003/0076621 | A1 | 4/2003 | Kim |
| 2006/0002008 | A1 | 1/2006 | Lim |
| 2006/0114603 | A1 | 6/2006 | Ser et al. |
| 2006/0146443 | A1 | 7/2006 | Chang et al. |

FOREIGN PATENT DOCUMENTS

EP 1256939 A2 11/2002

OTHER PUBLICATIONS

Kirpekar, Sujit et al., "A Study on the Efficacy of Flow Mitigation Devices in Hard Disk Drives", *IEEE Transactions on Magnetics*, No. 6, Jun. 2006, (Jun. 6, 2006),1716-1729.

\* cited by examiner

*Primary Examiner*—Mark Blouin

(57) ABSTRACT

A sickle-shaped disk drive spoiler for reducing turbulence of airflow in a hard disk drive is provided. The sickle-shaped spoiler includes a body portion for directing airflow generated by a rotating disk, the rotating disk comprising an inner diameter and an outer diameter and wherein the body portion of the spoiler directs airflow away from the outer diameter of the disk and wherein the body portion is curved to substantially mirror the outer diameter of the disk. The sickle-shaped spoiler also includes a first end portion for gradually directing airflow away from the body portion and towards the inner diameter and a second end portion for gradually directing airflow towards the body portion and towards the inner diameter.

30 Claims, 6 Drawing Sheets

600

Providing a body portion for directing airflow generated by a rotating disk, the rotating disk comprising an inner diameter and an outer diameter wherein the body portion directs airflow away from the outer diameter of the disk and wherein the body portion is curved to substantially mirror the outer diameter of the disk.
602

Providing a first end portion for gradually reducing airflow away from the body portion and towards the inner diameter.
604

Providing a second end portion for gradually increasing airflow towards the body portion and towards the inner diameter.
606

FIG. 6

APPARATUS AND METHOD FOR REDUCING TURBULENCE OF AIRFLOW IN A HARD DISK DRIVE

TECHNICAL FIELD

The present invention relates to the field of hard disk drives, and more particularly to an apparatus and method for reducing turbulence of airflow in a hard disk drive.

BACKGROUND ART

Hard disk drives are used in almost all computer system operations. In fact, most computing systems are not operational without some type of hard disk drive to store the most basic computing information such as the boot operation, the operating system, the applications, and the like. In general, the hard disk drive is a device which may or may not be removable, but without which the computing system will generally not operate.

The basic hard disk drive model was established approximately 50 years ago and resembles a phonograph. That is, the hard drive model includes a storage disk or hard disk that spins at a standard rotational speed. An actuator arm or slider is utilized to reach out over the disk. The arm has a magnetic read/write transducer or head for reading/writing information to or from a location on the disk. The complete assembly, e.g., the arm and head, is called a head gimbal assembly (HGA).

In operation, the hard disk is rotated at a set speed via a spindle motor assembly having a central drive hub. Additionally, there are tracks evenly spaced at known intervals across the disk. When a request for a read of a specific portion or track is received, the hard disk aligns the head, via the arm, over the specific track location and the head reads the information from the disk. In the same manner, when a request for a write of a specific portion or track is received, the hard disk aligns the head, via the arm, over the specific track location and the head writes the information to the disk.

Over the years, the disk and the head have undergone great reductions in their size. Much of the refinement has been driven by consumer demand for smaller and more portable hard drives such as those used in personal digital assistants (PDAs), MP3 players, and the like. For example, the original hard disk drive had a disk diameter of 24 inches. Modern hard disk drives are much smaller and include disk diameters of less than 2.5 inches (micro drives are significantly smaller than that). Advances in magnetic recording are also primary reasons for the reduction in size.

A second refinement to the hard disk drive is the increased efficiency and reduced size of the spindle motor spinning the disk. That is, as technology has reduced motor size and power draw for small motors, the mechanical portion of the hard disk drive can be reduced and additional revolutions per minute (RPMs) can be achieved. For example, it is not uncommon for a hard disk drive to reach speeds of 15,000 RPMs. This second refinement provides weight and size reductions to the hard disk drive, it also provides a faster read and write rate for the disk thereby providing increased speed for accessing data. The increase in data acquisition speed due to the increased RPMs of the disk drive and the more efficient read/write head portion provide modern computers with hard disk speed and storage capabilities that are continually increasing.

However, the higher RPMs of the disk has resulted in problems with respect to the interaction of the air with components of the hard disk drive. For example, although the hard disk drive is closed off from the outside, it has an amount of air within its packaging. As the disk spins and the RPMs increase, the air within the hard disk drive package will also begin to rotate and will eventually approach the speed at which the disk is rotating especially near the spindle hub and disk surfaces. This is due to the friction between the disk and the air. In general, Reynolds numbers are used to represent the flow characteristics. For example, in one case the Reynolds number may be based on the tip speed of the disk, that is, the linear velocity at the outer diameter of the disk, the disk diameter or other characteristic length scale, and the kinematic viscosity of the air.

Only when the Reynolds number is sufficiently small (e.g., an enclosure with reduced air density), the air may stay in laminar flow with the boundary layer of air remaining smooth with respect to the rotating disk. However, any obstructions to the flow will result in turbulence. That is, due to the introduction of obstructions to the airflow, the airflow will become turbulent as it passes the obstruction. Usually, the Reynolds number is so large that the airflow is turbulent near the disk rim, even where the arm is loaded onto a load/unload ramp.

As is well known from fluid mechanics, the characteristics of turbulent airflow can lead to buffeting, harmonic vibration, and the like. Each of these characteristics will result in problematic motion for the arm and head portion and/or the rotating disk. The problematic motion will result in excessive track misregistration. This is even more significant as the track pitch of the tracks on hard disks is further reduced.

SUMMARY

A sickle-shaped disk drive spoiler for reducing turbulence of airflow in a hard disk drive is provided. The sickle-shaped spoiler includes a body portion for directing airflow generated by a rotating disk, the rotating disk comprising an inner diameter and an outer diameter and wherein the body portion of the spoiler directs airflow away from the outer diameter of the disk and wherein the body portion is curved to substantially mirror the outer diameter of the disk. The sickle-shaped spoiler also includes a first end portion for gradually directing airflow away from the body portion and towards the inner diameter and a second end portion for gradually directing airflow towards the body portion and towards the inner diameter.

BRIEF DESCRIPTION OF THE DRAWINGS

FIG. 6 is a flow diagram of an exemplary method for reducing turbulence of airflow in a hard disk drive in accordance with embodiments of the present invention.

BEST MODES FOR CARRYING OUT THE INVENTION

Reference will now be made in detail to the alternative embodiment(s) of the present invention, an apparatus and method for reducing turbulence of airflow in a hard disk drive. While the invention will be described in conjunction with the alternative embodiment(s), it will be understood that they are not intended to limit the invention to these embodiments. On the contrary, the invention is intended to cover alternatives, modifications and equivalents, which may be included within the spirit and scope of the invention as defined by the appended claims.

Furthermore, in the following detailed description of the present invention, numerous specific details are set forth in order to provide a thorough understanding of the present invention. However, it will be recognized by one of ordinary skill in the art that the present invention may be practiced without these specific details. In other instances, well known methods, procedures, components, and circuits have not been described in detail as not to unnecessarily obscure aspects of the present invention.

Figure 1:
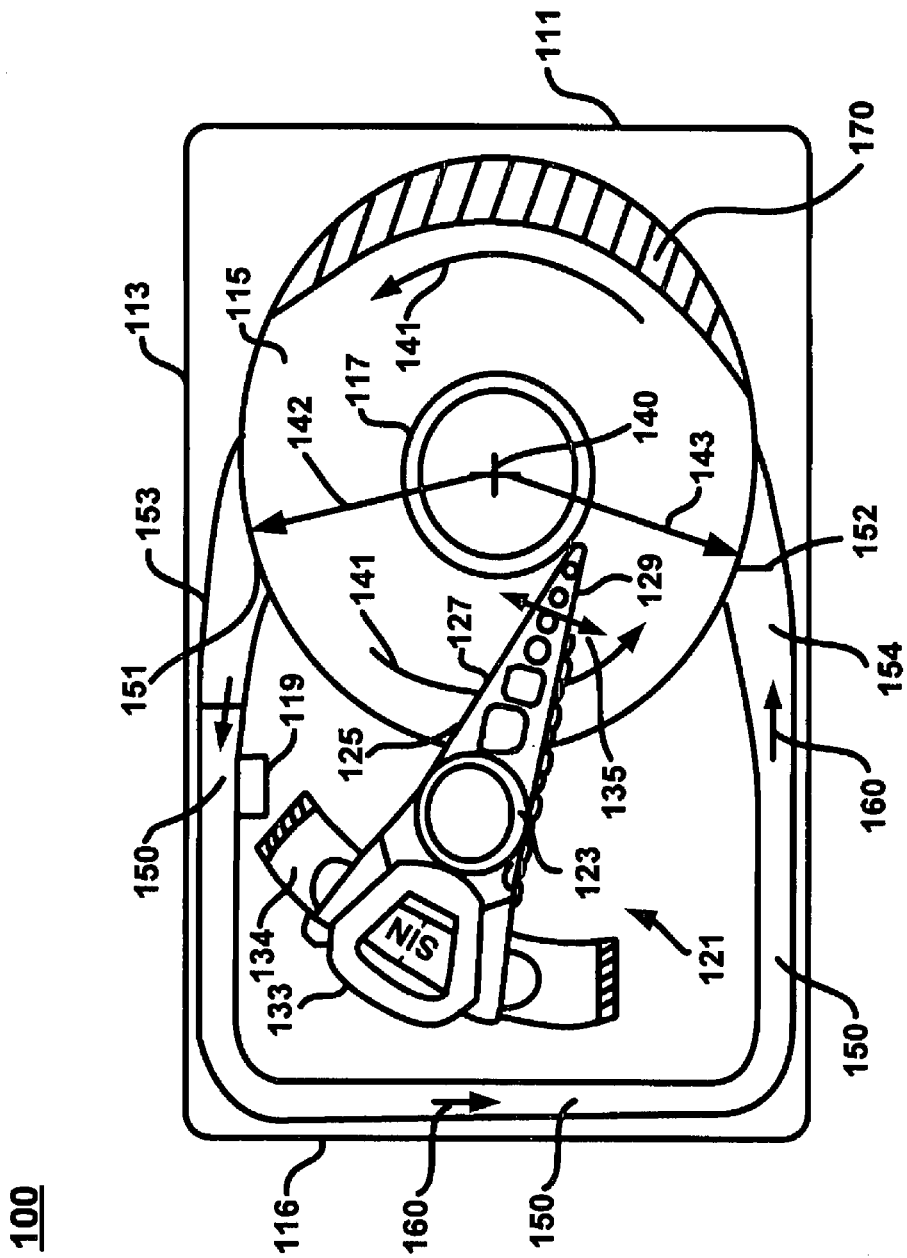
FIG. 1 is a schematic, top plan view of a hard disk drive in accordance with one embodiment of the present invention.

With reference now to FIG. 1, a schematic drawing of one embodiment of an information storage system 100 comprising a magnetic hard disk file or drive 111 for a computer system is shown. Drive 111 has an outer housing or base 113 containing a disk pack having at least one media or magnetic disk 115. The disk or disks 115 are rotated (see arrows 141) by a spindle motor assembly having a central drive hub 117. An actuator 121 comprises a plurality of parallel actuator arms 125 (one shown) in the form of a comb that is movably or pivotally mounted to base 113 about a pivot assembly 123. A controller 119 is also mounted to base 113 for selectively moving the comb of arms 125 relative to disk 115. The air circulation in the device 100 is handled by full bypass 150.

In the embodiment shown, each arm 125 has extending from it at least one cantilevered load beam and suspension 127. A magnetic read/write transducer or head is mounted on a slider 129 and secured to a flexure that is flexibly mounted to each suspension 127. The read/write heads magnetically read data from and/or magnetically write data to disk 115. The level of integration called the head gimbal assembly (HGA) is head and the slider 129, which are mounted on suspension 127. The slider 129 is usually bonded to the end of suspension 127. The head is typically pico size (approximately 1160× 1000×300 microns) and formed from ceramic or intermetallic materials. The head also may be of "femto" size (approximately 850×700×230 microns) and is pre-loaded against the surface of disk 115 (in the range two to ten grams) by suspension 127.

Suspensions 127 have a spring-like quality, which biases or urges the air-bearing surface of the slider 129 against the disk 115 to cause the slider 129 to fly at a precise distance from the disk. A voice coil 133 free to move within a conventional voice coil motor magnet assembly 134 (top pole not shown) is also mounted to arms 125 opposite the head gimbal assemblies. Movement of the actuator 121 (indicated by arrow 135) by controller 119 moves the head gimbal assemblies along radial arcs across tracks on the disk 115 until the heads settle on their respective target tracks. The head gimbal assemblies operate in a conventional manner and always move in unison with one another, unless drive 111 uses multiple independent actuators (not shown) wherein the arms can move independently of one another.

Referring still to FIG. 1, the disk pack and disks 115 (one shown) define an axis 140 of rotation 141 and radial directions 142, 143, relative to the axis 140. The drive 111 also has a bypass channel 150 formed in the housing 113 for directing the airflow 160 generated by rotation of the disks 115 from the upstream side of the disk pack or disks (e.g., proximate to radial direction 142 in FIG. 1) 115 to the downstream side of the disk pack or disks 115 (e.g., proximate to radial direction 143 in FIG. 1). FIG. 1 shows a sickle-shaped spoiler 170 in accordance with embodiments of the present invention. In one embodiment, the sickle-shaped spoiler 170 is located opposite the actuator 121 to gradually direct airflow towards the inner diameter of the disk 115.

In the embodiment shown, the bypass channel 150 is located between an outer perimeter 116 of the housing 113 and the actuator 121, such that the bypass channel 150 completely circumscribes the actuator 121. Bypass channel 150 further comprises a first opening 151 proximate to upstream side wherein air is conveyed away from the disks 115 and a second opening 152 proximate to downstream side wherein airflow 160 is directed toward the disks 115.

As shown in FIG. 1, one embodiment of the drive 111 bypass channel 150 also comprises a diffuser 153. In the embodiment shown, the diffuser 153 is located in the bypass channel 150 and is positioned adjacent to the upstream side of the disk pack or disks 115. The diffuser 153 is also offset upstream from the disks 115 in the radial direction 142, such that the diffuser 153 reduces airflow drag from the disks 115 due to disk wake in the bypass channel 150. This type of aerodynamic drag is commonly called base drag.

Alternatively, or operating in conjunction with the diffuser 153, another embodiment of the drive 111 may include a contraction 154 (e.g., inlet to a Venturi). The contraction 154 is also located in the bypass channel 150, but is adjacent to the downstream side of the disk pack or disks 115. Like the diffuser 153, the contraction 154 is typically offset downstream from the disks 115, but in a radial direction 143. Each of the diffuser 153 and the contraction 154 may be spaced apart from the outer edges of the disks 115 in radial directions 142, 143 by, for example, approximately 0.5 mm. The contraction 154 may be provided for re-accelerating bypass airflow 160 to provide efficient energy conversion for the air flow from pressure energy to kinetic energy prior to merging bypass airflow 160 with air flow 141 around the disks 115.

In embodiments of the present invention, disk drive system 111 may be filled with a gas (e.g., helium) rather than ambient air. This may be advantageous in that helium is a lighter gas than ambient air and causes less buffeting of actuator 121 when disk drive system 111 is in operation. In embodiments of the present invention, disk drive 111 may be sealed after the servo writing process to keep the helium in the drive. Alternatively, the helium may be removed from disk drive 111 and ambient air is allowed to return into the disk drive prior to sealing first opening 151 and second opening 152.

Sickle-Shaped Spoiler for Reducing Turbulence of Air in a Disk Drive

Embodiments of the present invention include a sickle-shaped spoiler design to reduce turbulence of air in a hard disk drive. In one embodiment of the invention, the spoiler is sickle-shaped to enable gradual radial deflection of airflow. In one embodiment, the sickle-shaped spoiler reduces air turbulence without increasing motor torque. The sickle-shaped spoiler also shields the arm from high air speed air flow in one embodiment. The spoiler also reduces air turbulence, especially near the outer diameter (OD) of the rotating disks. Furthermore, embodiments of the present invention include a mounting system incorporated into the sickle-shaped spoiler for improved manufacturing.

Embodiments of the present invention are directed to reducing track misregistration (TMR) associated with a disk drive. TMR is a well known measurement in the art that quantifies how much the read/write head of the disk drive is "off track." TMR is often described as a percentage of the drive's track pitch or can be described in absolute distance terms (nanometers). Airflow turbulence is a factor that contributes to TMR.

In particular, airflow at the outer diameter of the disk impacts movement of the disk more than airflow at the inner diameter of the disk. Embodiments of the present invention direct airflow away from the outer diameter of the disk and towards the inner diameter of the disk to reduce airflow turbulence and hence reduce TMR.

Figure 2:
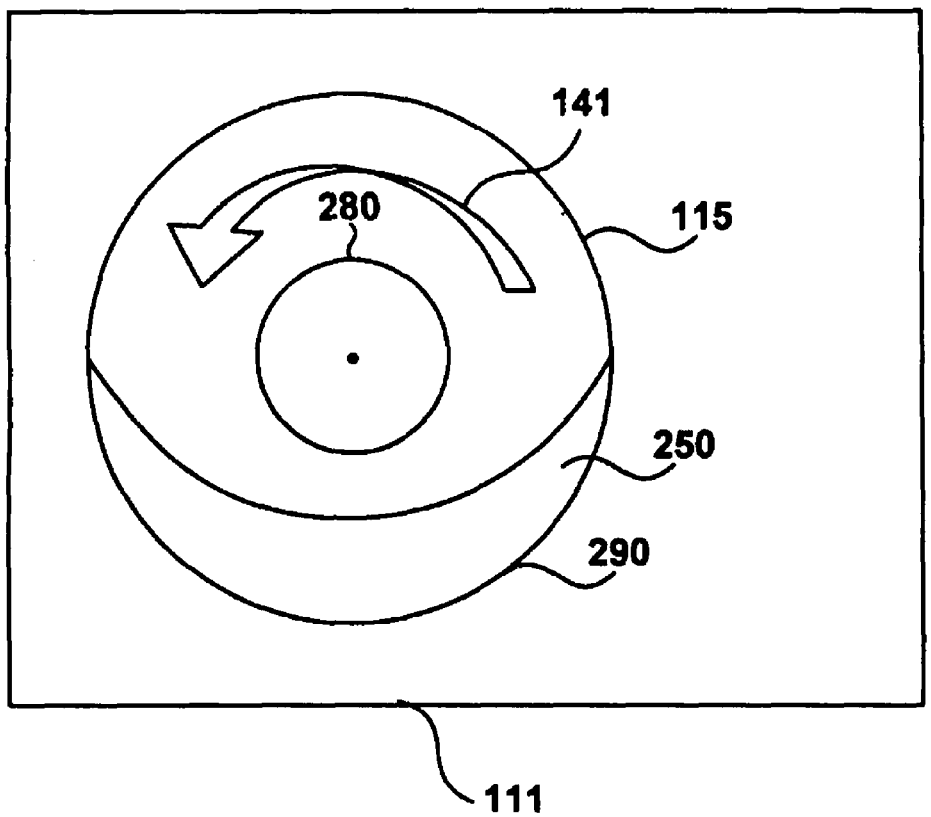
FIG. 2 is a diagram of an exemplary disk drive disk and a sickle-shaped spoiler for reducing air turbulence in accordance with embodiments of the present invention

FIG. 2 is a diagram 200 of an exemplary disk drive disk 115 and a sickle-shaped spoiler 250 for reducing air turbulence in a disk drive 111 in accordance with embodiments of the present invention.

In FIG. 2, the sickle-shaped spoiler 250 is a partial moon shape with tapered end portions. In one embodiment, the tapered end portions enable gradual deflection of airflow. In one embodiment, the sickle shaped spoiler 250 directs airflow away from the outer diameter 290 of the disk 115 towards the inner diameter 280 of the disk 115.

Airflow is generated by rotation 141 of disk 115. The speed of the airflow between the spoiler 250 and the inner diameter 280 is increased while airflow on the opposite side of the disk 115 (with respect to the spoiler 250) is reduced. It is appreciated that many different configurations of a sickle-shaped spoiler can be used in accordance with embodiments of the invention.

It is appreciated that the sickle-shaped spoiler 250 is curved to approximately mirror the outer diameter 290 of the disk 115. It is also appreciated that the end portions of the sickle-shaped spoiler may or may not be symmetrical with respect to each other.

The terms "inner diameter" and "outer diameter" are intended to be for illustrative purposes only. The term inner diameter referrers to a portion of the disk that is inside of the outer diameter of the disk with respect to the middle of the disk.

It is appreciated that the sickle-shaped spoiler of the present invention can include perforations, and/or surface contours to further improve the spoiler design. For example, a perforation through the spoiler perpendicular to the surface of the disk may reduce particle accumulation on the disk surface. It is appreciated that many surface characteristics of the spoiler can be used in accordance with embodiments of the present invention.

Figure 3:
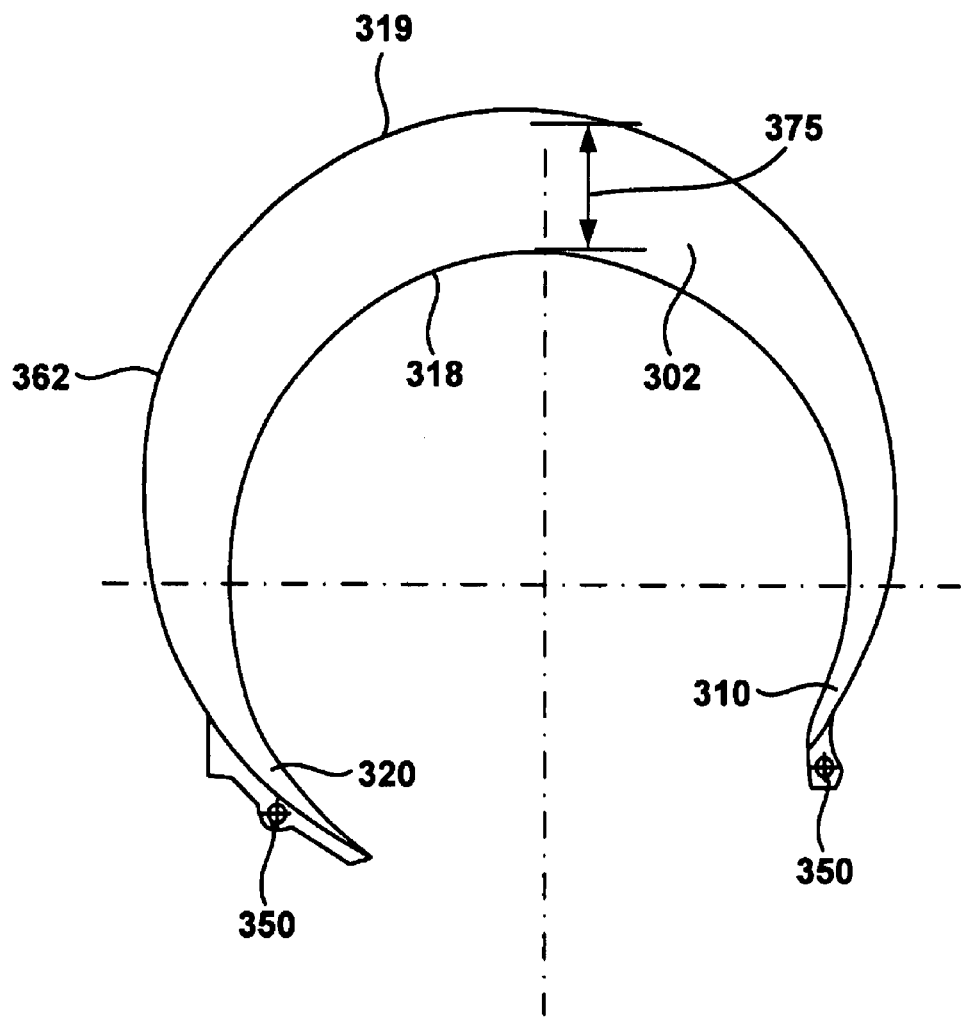
FIG. 3 is a top view of an exemplary sickle-shaped spoiler with a body portion that tapers in width from a middle portion to end portions in accordance with embodiments of the present invention

FIG. 3 is a top view of an exemplary sickle-shaped spoiler 300 with a body portion 302 that tapers in width from a middle width 375 to end portions 310 and 320 in accordance with embodiments of the present invention. In this embodiment, the spoiler 300 has a circumferential length 362 (on the outside diameter side 318) that is greater than half the circumferential length of the disk (not shown).

In one embodiment, the body portion 302 directs airflow away from the outer diameter side 319. In one embodiment, end portion 310 directs airflow away from the body portion 302 and increases air flow toward the inner diameter of the disk. In another embodiment, end portion 320 directs airflow away from the body portion 302 and increases air flow toward the inner diameter of the disk.

It is appreciated that the curve of the sickle-shaped spoiler 300 roughly mirrors the curve of the disk (not shown) such that the outer diameter edge 319 of the spoiler 300 approximately aligns with the outer diameter edge of the disk.

In this embodiment, the width of end portion 320 tapers to a point where the outer diameter side 319 of the spoiler meets the inner diameter side 318 of the spoiler 300.

The width of end portion 310 also tapers to a point where the outer diameter side 319 of the spoiler meets the inner diameter side 318 of the spoiler 300. Spoiler 300 also includes attachment points 350.

Attachment points 350 are integrated into the spoiler 300 to enable attachment of the spoiler 300 in a disk drive. Because of their flexibility, the sickle shaped spoilers of the present invention can be mounted in a simple way. As implied by their name, sickle spoilers of the c-ring type can be secured by bending in their plane.

While distorted, the spoiler 300 can be inserted into place and once in place, the distortion provides enough force (tensile or compression) to keep the spoiler in the desired location. In one embodiment, the spoiler 300 is self mounting and does not require screws or adhesive to be mounted securely.

The spoiler 300 of FIG. 3 includes a tapered design wherein the spoiler width tapers from a middle width 375 to points on each end 320 and 310. The gradual taper in width enables a gradual deflection of airflow which reduces turbulence of airflow in a disk drive.

Figure 4:
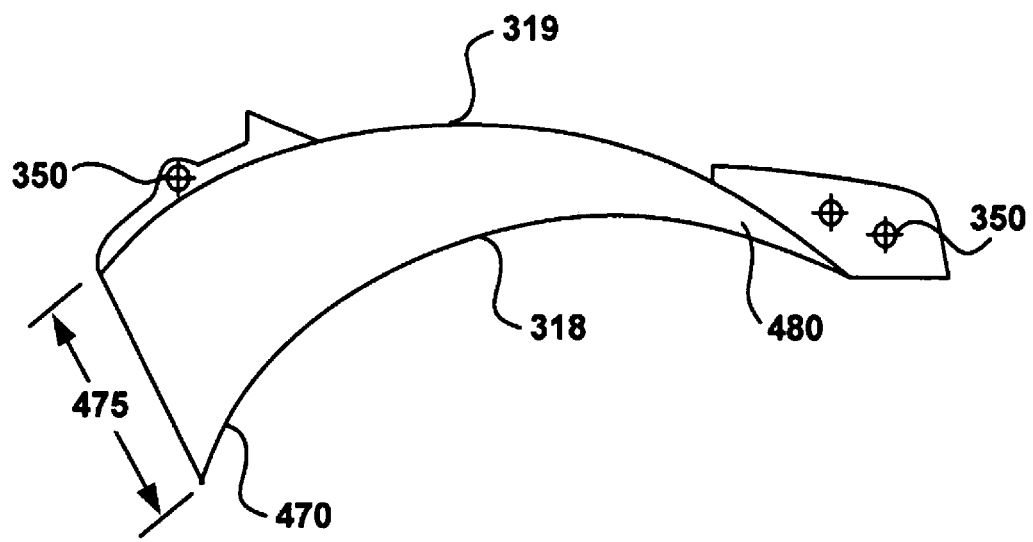
FIG. 4 is a top view of an exemplary sickle-shaped spoiler that tapers from a width at a first end to a point at a second end in accordance with embodiments of the present invention.

FIG. 4 is a top view of an exemplary sickle-shaped spoiler 400 that tapers in width from width 475 at a first end 470 to a point at a second end 480 in accordance with embodiments of the present invention. In this embodiment, spoiler 400 directs airflow from the outer diameter side 319 towards the inner diameter side 318.

Figure 5:
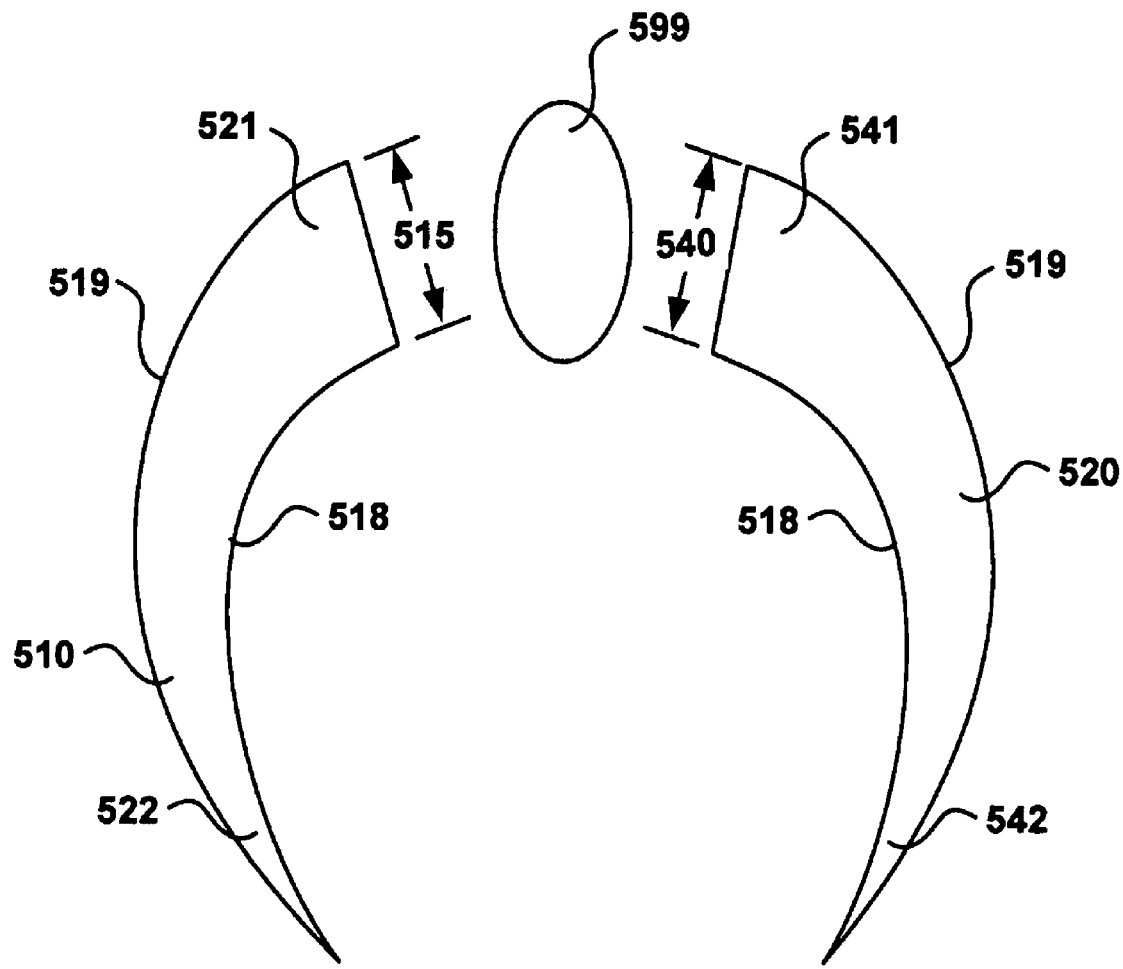
FIG. 5 is a top view of an exemplary two piece sickle-shaped spoiler in accordance with embodiments of the present invention.

FIG. 5 is a top view of an exemplary two piece sickle-shaped spoiler 500 in accordance with embodiments of the present invention. In this embodiment, two sickle shaped spoilers 510 and 520 are used. However, it is appreciated that any number of sickle-shaped spoilers could be used in accordance with the present invention. Sickle-shaped spoilers 510 and 520 could be any shape as described in FIGS. 2-4 or any other sickle-shape.

Spoiler 510 tapers in width 515 from a first end 521 to a second end 522. The spoiler 510 directs airflow from the outer diameter side 519 to the inner diameter side 518.

Spoiler 520 tapers in width 540 from a first end 541 to a second end 542. The spoiler 520 directs airflow from the outer diameter side 519 to the inner diameter side 518.

It is appreciated that the space 599 between spoiler 510 and 520 may be the location of an actuator arm (not shown) wherein one spoiler is "upstream" from the actuator arm and the other is "downstream" of the actuator arm.

FIG. 6 is a flow diagram of an exemplary method 600 for reducing turbulence of airflow in a hard disk drive in accordance with embodiments of the present invention.

At 602, 600 includes providing a body portion for directing airflow generated by a rotating disk, the rotating disk comprising an inner diameter and an outer diameter wherein the body portion directs airflow away from the outer diameter of the disk and wherein the body portion is curved to substantially mirror the outer diameter of the disk.

At 604, 600 includes providing a first end portion for gradually reducing airflow away from the body portion and towards the inner diameter.

At 606, 600 providing a second end portion for gradually increasing airflow towards the body portion and towards the inner diameter.

The alternative embodiment(s) of the present invention, a method and system for reducing particle accumulation on a disk surface in a hard disk drive, is thus described. While the present invention has been described in particular embodiments, it should be appreciated that the present invention should not be construed as limited by such embodiments, but rather construed according to the below claims.

What is claimed is:

1. A sickle-shaped disk drive spoiler comprising:
a body portion for directing airflow generated by a rotating disk, said rotating disk comprising an inner diameter and an outer diameter wherein said body portion directs airflow away from said outer diameter of said disk and wherein said body portion is curved to substantially mirror said outer diameter of said disk;
a first end portion for gradually directing airflow away from said body portion and towards said inner diameter; and
a second end portion for gradually directing airflow towards said body portion and towards said inner diameter.

2. The disk drive spoiler as described in claim 1 wherein said first end portion gradually tapers to a point to enable gradual direction of airflow away from said body portion and towards said inner diameter.

3. The disk drive spoiler as described in claim 1 wherein said second end portion gradually tapers to a point to enable gradual direction of airflow towards said body portion and towards said inner diameter.

4. The disk drive spoiler as described in claim 1 wherein said body portion, said first end portion or said second end portion comprise perforations perpendicular to said rotating disk.

5. The disk drive spoiler as described in claim 1 wherein said first end portion or said second end portion comprises an attachment mechanism for mounting said spoiler proximate said rotating disk such that said spoiler is stationary with respect to said rotating disk.

6. The disk drive spoiler as described in claim 1 wherein an outer diameter side circumferential length of said spoiler is greater than half the circumference of said rotating disk.

7. The disk drive spoiler as described in claim 1 wherein said first end portion is asymmetrical with said second end portion.

8. A hard disk drive comprising:
a housing;
a disk pack mounted to the housing and having a plurality of disks that are rotatable relative to the housing, the disk pack defining an axis of rotation and a radial direction relative to the axis, said disks comprising an inner diameter and an outer diameter;
an actuator mounted to the housing and being movable relative to the disk pack, the actuator having a plurality of heads for reading data from and writing data to the disks; and
a plurality of spoilers, at least one spoiler sickle-shaped and comprising:
a body portion for directing airflow away from said outer diameter of said disk and wherein said body portion is curved to substantially mirror said outer diameter of said disk;
a first end portion for gradually directing airflow away from said body portion and towards said inner diameter; and
a second end portion for gradually directing airflow towards said body portion and towards said inner diameter.

9. The disk drive as described in claim 8 wherein said first end portion of said sickle-shaped spoiler gradually tapers to a point to enable gradual direction of airflow away from said body portion and towards said inner diameter.

10. The disk drive as described in claim 8 wherein said second end portion of said sickle-shaped spoiler gradually tapers to a point to enable gradual direction of airflow towards said body portion and towards said inner diameter.

11. The disk drive as described in claim 8 wherein said body portion, said first end portion or said second end portion of said sickle-shaped spoiler comprise perforations perpendicular to said rotatable disks.

12. The disk drive as described in claim 8 wherein said first end portion or said second end portion of said sickle-shaped spoiler comprises an attachment mechanism for mounting said spoiler proximate one of said rotatable disks such that said spoiler is stationary with respect to said rotatable disks and wherein said attachment mechanism utilizes a compression force or tensile force of said spoiler to enable said mounting.

13. The disk drive as described in claim 8 wherein a circumferential length of said spoiler is greater than half the circumference of one of said rotatable disks.

14. The disk drive as described in claim 8 wherein said first end portion is asymmetrical with said second end portion.

15. A method for reducing turbulence of airflow in a hard disk drive comprising:
providing a body portion for directing airflow generated by a rotating disk, said rotating disk comprising an inner diameter and an outer diameter wherein said body portion directs airflow away from said outer diameter of said disk and wherein said body portion is curved to substantially mirror said outer diameter of said disk;
providing a first end portion for gradually directing airflow away from said body portion and towards said inner diameter; and
providing a second end portion for gradually directing airflow towards said body portion and towards said inner diameter.

16. The method as described in claim 15 wherein said first end portion gradually tapers to a point to enable gradual direction of airflow away from said body portion and towards said inner diameter.

17. The method as described in claim 15 wherein said second end portion gradually tapers to a point to enable gradual direction of airflow towards said body portion and towards said inner diameter.

18. The method as described in claim 15 wherein said body portion, said first end portion or said second end portion comprise perforations perpendicular to said rotating disk.

19. The method as described in claim 15 wherein said first end portion or said second end portion comprises an attachment mechanism for mounting said spoiler proximate said rotating disk such that said spoiler is stationary with respect to said rotating disk.

20. The method as described in claim 15 wherein a circumferential length of said spoiler is greater than half the circumference of said rotating disk.

21. The method as described in claim 15 wherein said first end portion is asymmetrical with said second end portion.

22. The disk drive spoiler as described in claim 1 wherein said body portion, said first end portion or said second end portion are configured to be disposed between said rotating disk and a disk drive cover.

23. The disk drive spoiler as described in claim 1 wherein said body portion, said first end portion or said second end portion are configured to be disposed between said rotating disk and a disk drive base.

24. The disk drive spoiler as described in claim 1 wherein said body portion, said first end portion or said second end portion are configured to be disposed between a plurality of disks.

25. The disk drive as described in claim 8 wherein at least one said body portion, said first end portion or said second end portion are configured to be disposed between a disk of said disk pack and a top cover of said housing.

26. The disk drive as described in claim 8 wherein at least one said body portion, said first end portion or said second end portion are configured to be disposed between a disk of said disk pack and a bottom base of said housing.

27. The disk drive as described in claim 8 wherein at least one said body portion, said first end portion or said second end portion are configured to be disposed between a plurality of disks of said disk pack.

28. The method of claim 15 further comprising:
disposing said body portion, said first end portion or said second end portion between said disk and a top cover of said disk drive.

29. The method of claim 15 further comprising:
disposing said body portion, said first end portion or said second end portion between said disk and a bottom base of said disk drive.

30. The method of claim 15 further comprising:
disposing said body portion, said first end portion or said second end portion between a plurality of disks of said disk drive.

* * * * *